United States Patent
Glowaty et al.

(10) Patent No.: US 9,654,834 B2
(45) Date of Patent: May 16, 2017

(54) COMPUTING SIMILARITY BETWEEN MEDIA PROGRAMS

(71) Applicant: Google Inc., Mountain View, CA (US)

(72) Inventors: Grzegorz Glowaty, Przemysl (PL); Michal Brzozowski, Warsaw (PL); Marcin Wielgus, Cracow (PL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/515,409

(22) Filed: Oct. 15, 2014

(65) Prior Publication Data
US 2015/0052564 A1 Feb. 19, 2015

Related U.S. Application Data

(63) Continuation of application No. 13/467,339, filed on May 9, 2012, now Pat. No. 8,869,208.
(Continued)

(51) Int. Cl.
*G06F 3/00* (2006.01)
*G06F 13/00* (2006.01)
(Continued)

(52) U.S. Cl.
CPC ... *H04N 21/4826* (2013.01); *G06F 17/30817* (2013.01); *H04N 21/435* (2013.01); *H04N 21/4828* (2013.01)

(58) Field of Classification Search
None
See application file for complete search history.

(56) References Cited

U.S. PATENT DOCUMENTS 5,732,260 A * 3/1998 Nomiyama
5,749,081 A 5/1998 Whiteis
(Continued)

FOREIGN PATENT DOCUMENTS

CN 101292238 5/2010
CN 102265276 11/2011
(Continued)

OTHER PUBLICATIONS

Becker, H., et al., "Learning Similarity Metrics for Event Identification in Social Media", In Proceedings of the Third ACM International Conference on Web Search and Data Mining, New York, NY, US, Feb. 6, 2010, pp. 291-300.
(Continued)

*Primary Examiner* — William J Kim
(74) *Attorney, Agent, or Firm* — Byrne Poh LLP (57) ABSTRACT

System and method are provided to associate or compare media programs. A method includes: obtaining, using at least one processing circuit, first metadata for a first media program and second metadata for a second media program, wherein the first metadata are organized into a plurality of first fields, and the second metadata are organized into a plurality of second fields; extracting, using at least one processing circuit, a plurality of first tokens from one of the plurality of first fields and a plurality of second tokens from one of the plurality of second fields; assigning a weight factor to each of the first and second tokens; cross-correlating the first and second tokens between the plurality of first fields and the plurality of second fields; and calculating a similarity score between the first and second media programs based on the cross-correlating.

20 Claims, 6 Drawing Sheets

Related U.S. Application Data (60) Provisional application No. 61/553,221, filed on Oct. 30, 2011.

(51) Int. Cl.
*H04N 5/445* (2011.01)
*H04N 21/482* (2011.01)
*G06F 17/30* (2006.01)
*H04N 21/435* (2011.01)

(56) References Cited

U.S. PATENT DOCUMENTS

| | | | |
|---|---|---|---|
| 5,754,939 A * | 5/1998 | Herz et al. | 455/3.04 |
| 7,403,910 B1 * | 7/2008 | Hastings et al. | 705/26.1 |
| 2002/0042923 A1 * | 4/2002 | Asmussen et al. | 725/92 |
| 2002/0129368 A1 * | 9/2002 | Schlack et al. | 725/46 |
| 2002/0143802 A1 * | 10/2002 | Chi et al. | 707/203 |
| 2002/0151327 A1 * | 10/2002 | Levitt | 455/556 |
| 2003/0130993 A1 * | 7/2003 | Mendelevitch | G06F 17/3071 |
| 2004/0068697 A1 * | 4/2004 | Harik et al. | 715/513 |
| 2005/0222989 A1 * | 10/2005 | Haveliwala et al. | 707/3 |
| 2006/0031207 A1 | 2/2006 | Bjarnestam et al. | |
| 2007/0094251 A1 | 4/2007 | Lu et al. | |
| 2007/0150279 A1 | 6/2007 | Gandhi et al. | |
| 2007/0204287 A1 | 8/2007 | Conradt et al. | |
| 2008/0126303 A1 | 5/2008 | Park et al. | |
| 2008/0189232 A1 * | 8/2008 | Dunning et al. | 706/45 |
| 2008/0270344 A1 | 10/2008 | Yurick et al. | |
| 2008/0320522 A1 | 12/2008 | Jones | |
| 2009/0070325 A1 | 3/2009 | Gabriel et al. | |
| 2009/0077589 A1 | 3/2009 | Boyer et al. | |
| 2009/0171990 A1 | 7/2009 | Naef | |
| 2010/0333140 A1 * | 12/2010 | Onodera et al. | 725/44 |
| 2011/0213655 A1 * | 9/2011 | Henkin | G06Q 30/00 705/14.49 |
| 2011/0320482 A1 | 12/2011 | Barbieri et al. | |
| 2012/0117484 A1 * | 5/2012 | Convertino | G06F 17/30864 715/744 |

FOREIGN PATENT DOCUMENTS

| | | |
|---|---|---|
| WO | WO/98/33135 | 7/1998 |
| WO | WO/98/40832 | 9/1998 |

OTHER PUBLICATIONS

Bron, M. et al. "Linking Archives Using Document Enrichment and Term Selection", In Research and Advanced Technology for Digital Libraries, vol. 6966, Sep. 26, 2011, pp. 360-371.
How Stuff Works, "How Netflix Works—The Netflix Shipping System", pp. 1-2, available at: http://electronics.howstuffworks.com/netflix2.htm, last accessed Nov. 22, 2011.
International Preliminary Report on Patentability of the International Search Authority dated Sep. 13, 2012 in International Patent Application No. PCT/US2012/055222.
International Search Report and Written Opinion of the International Search Authority dated Feb. 1, 2013 in International Patent Application No. PCT/US2012/055222.
Office Action dated Jan. 8, 2014 in U.S. Appl. No. 13/467,339.
Supplementary European Search Report dated Apr. 8, 2016 in European Patent Application No. 12845629.0.
Office Action dated Nov. 18, 2016 in CN Application No. 201280062329.X.

* cited by examiner

| Y \ X | Description | Title | Cast | Wiki Plot | Genre |
|---|---|---|---|---|---|
| Description | 1 | 0.8 | 0.6 | 0.9 | 0 |
| Title | 0.8 | 1 | 0 | 0.5 | 0 |
| Cast | 0.6 | 0 | 1 | 0.4 | 0 |
| Wiki Plot | 0.9 | 0.5 | 0.4 | 1 | 0 |
| Genre | 0 | 0 | 0 | 0 | 1 |

COMPUTING SIMILARITY BETWEEN MEDIA PROGRAMS

CROSS-REFERENCE TO RELATED APPLICATIONS

This application is a continuation of U.S. patent application Ser. No. 13/467,339, filed May 9, 2012, which claims the benefit of U.S. Provisional Application No. 61/553,221, filed Oct. 30, 2011. Each of the above-referenced patent applications is hereby incorporated by reference herein in their entireties.

BACKGROUND

This specification relates generally to media programs, and particularly to determining relationships among television programs.

The Internet provides access to a wide variety of sources, such as video files, audio files, pictures, business and personnel contact information, product information, maps, and news articles. Accessing these sources can produce business opportunities such as advertising opportunities. Although textual data were prevalent during early days of the Internet, media programs such as video and audio files are becoming more popular with the increase of the bandwidth.

SUMMARY

In one aspect, a computer-implemented method of associating media programs is provided. The method may include: (A) obtaining, using at least one processing circuit, first metadata for a first media program and second metadata for a second media program, wherein the first metadata are organized into a plurality of first fields, and the second metadata are organized into a plurality of second fields; (B) extracting, using at least one processing circuit, a plurality of first tokens from each of the plurality of the first fields and a plurality of second tokens from each of the plurality of second fields; (C) assigning a weight factor to each of the first and second tokens; (D) cross-correlating the first and second tokens between the plurality of first fields and the plurality of second fields; and (E) calculating a similarity score between the first and second media programs based on said cross-correlating.

In one implementation, (D) includes (F) constructing a first vector representing one of the plurality of first fields based on the first tokens and their respective weight factors, and a second vector representing one of the plurality of second field based on the second tokens and their respective weight factors; (G) computing a dot product of the first and the second vectors indicating a similarity between the one of the plurality of first fields and the one of the plurality of second fields; and (H) performing (F) and (G) for all of the plurality of first fields and plurality of second fields, wherein the similarity score is calculated based on adding a plurality dot products obtained from (H).

In one implementation the one of the plurality of first fields and the one of the plurality of second fields respectively represent casts of the first and second media programs, and wherein the plurality of first tokens and the plurality of second tokens respectively represent a plurality of actors in the first and second media programs. The method may further include delivering a suggestion of a media program to a user based on the similarity score."

In one implementation, the method includes computing a first frequency of occurrences of each of the first and second tokens within each field; and computing a second frequency of occurrences of each of the first and second tokens across different fields, wherein the weight factor of each token may be assigned based on the calculated first and second frequencies.

In one implementation, the method includes adjusting at least one of the weight factors to give weight to selected tokens.

In one implementation, the method includes cross-correlating different fields between the first and second metadata using a matrix of weights.

In one implementation, the method includes computing a similarity score between the first media program and each of a plurality of media programs. In one implementation, the method includes ranking the plurality of media programs based on the similarity scores.

In one implementation, the method includes receiving a rating from a user based on the first media program; and predicting the user's ratings on the plurality of media programs based on the ranking.

In one implementation, the first and second metadata are obtained within a substantially uniform database.

In another implementation, the first and second metadata are obtained from a plurality of heterogeneous databases.

In another aspect, a non-transitory computer-readable medium having instructions stored thereon is provided. The instructions, when executed, may cause at least one processor to perform a plurality of operations including: (A) obtaining first metadata for a first media program and second metadata for a second media program, wherein the first metadata are organized into a plurality of first fields, and the second metadata are organized into a plurality of second fields; (B) extracting a plurality of first tokens from one of the plurality of the first fields and a plurality of second tokens from one of the plurality of second fields; (C) assigning a weight factor to each of the first and second tokens; (D) cross-correlating the first and second tokens between the plurality of first fields and the plurality of second fields; and (E) calculating a similarity score between the first and second media programs based on said cross-correlating.

In one implementation, (D) includes (F) constructing a first vector representing one of the plurality of first fields based on the first tokens and their respective weight factors, and a second vector representing one of the plurality of second field based on the second tokens and their respective weight factors; (G) computing a dot product of the first and the second vectors indicating a similarity between the one of the plurality of first fields and the one of the plurality of second fields; and (H) performing (F) and (G) for all of the plurality of first fields and plurality of second fields, wherein the similarity score is calculated based on adding a plurality dot products obtained from (H).

In one implementation, the plurality of first fields and the plurality of second fields respectively represent at least one of a cast, a description, a closed caption, or a title of the first and second media programs.

In one implementation, the instructions include computing a first frequency of occurrences of each of the first and second tokens within each field; and computing a second frequency of occurrences of each of the first and second tokens across different fields, wherein the weight factor of each token is assigned based on the calculated first and second frequencies.

In one implementation, the instructions include adjusting at least one of the weight factors to give weight to selected tokens.

In one implementation, the instructions include cross-correlating different fields between the first and second metadata using a matrix of weights.

In another aspect, a system including at least one processing circuit is provided. The at least one processing circuit may be configured to: (A) obtain first metadata for a first media program and second metadata for a second media program, wherein the first metadata are organized into a plurality of first fields, and the second metadata are organized into a plurality of second fields; (B) extract a plurality of first tokens from one of the plurality of the first fields and a plurality of second tokens from one of the plurality of second fields; (C) assign a weight factor to each of the first and second tokens; (D) cross-correlate the first and second tokens between the plurality of first fields and the plurality of second fields; and (E) calculate a similarity score between the first and second media programs based on said cross-correlating.

In one implementation, the at least one processing circuit is further configured to (F) construct a first vector representing one of the plurality of first fields based on the first tokens and their respective weight factors, and a second vector representing one of the plurality of second field based on the second tokens and their respective weight factors; (G) compute a dot product of the first and the second vectors indicating a similarity between the one of the plurality of first fields and the one of the plurality of second fields; and (H) perform (F) and (G) for all of the plurality of first fields and plurality of second fields, wherein the similarity score is calculated based on adding a plurality dot products obtained from (H).

In one implementation, the at least one processing circuit is configured to receive a user request of a media program through a smart TV module.

In one implementation, the at least one processing circuit is configured to cause display of a plurality of similar programs, based on their respectively calculated similarity scores, on the smart TV module.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

DETAILED DESCRIPTION

Following below are more detailed descriptions of various concepts related to, and embodiments of, inventive methods and systems for associating media programs. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Overview

Implementations disclosed herein can be used to associate media programs over the Internet. Such media programs, such as video and audio programs, can be displayed on an Internet television (TV) or web TV, or with a smart TV system.

Internet TV or web TV typically use a personal computer or a mobile device to stream or download media programs over the Internet. In a smart TV system, a smart TV module (or connected TV module, hybrid TV module, etc.) can integrate a conventional TV set with the Internet, and can bring a more integrated experience to users. A user can select desired content to view on the smart TV, play games over the Internet, browse web pages, etc., and may not necessarily discern whether the content is from broadcasting as in a conventional TV, or is from the Internet.

The smart TV may include a processing circuit configured to integrate internet connectivity with more traditional TV programming sources (e.g., received via cable, satellite, over-the-air, or other signals). The smart TV module may be physically incorporated into a TV set or may include a separate device such as a set-top box, Blu-ray or other digital media player, game console, hotel TV system, and other companion device.

A smart TV module may be configured to allow viewers to search and find videos, movies, photos and other content on the web, on a local cable TV channel, on a satellite TV channel, or stored on a local storage device. A set-top box (STB) or set-top unit (STU) may include an information appliance device that may contain a tuner and connect to a TV set and an external source of signal, turning the signal into content which is then displayed on the TV screen or other display device.

Figure 1:
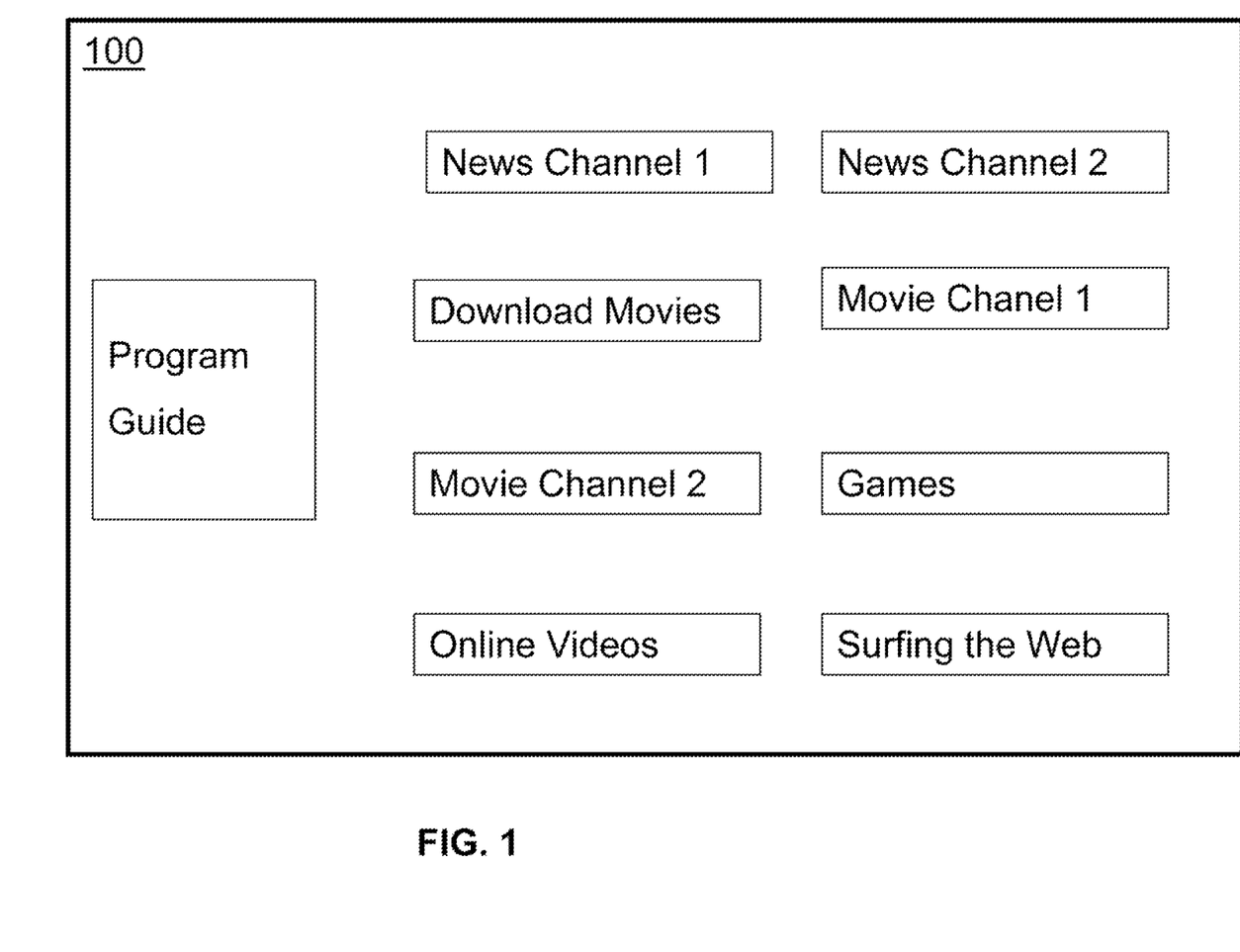
FIG. 1 is a block diagram illustrating an example of a smart TV interface.

As illustrated in an example in FIG. 1, a smart TV module may be configured to provide a home screen 100 or top level screen including icons for a plurality of different applications, such as a web browser and a plurality of streaming media services (e.g., Netflix, Vudu, Hulu, etc.), a connected cable or satellite media source, other web "channels", etc. The smart TV module may further be configured to provide an electronic programming guide to the user. A companion application to the smart TV module may be operable on a mobile computing device to provide additional information about available programs to a user, to allow the user to control the smart TV module, etc. An input device such as a keyboard can be included to allow the user to input more lengthy commands as in a conventional personal computer.

Correlations among textual data have found a large number of applications in the Internet, such as in keyword-based searches, and contextual and targeted advertising. Media programs such as audio and video programs are more difficult to be correlated or quantified. Implementations disclosed herein allow similarities to be computed between media programs, such as TV programs, movies, series, shows, music, and other data, including non-textual data.

Metadata About Media Programs

In one implementation, a similarity is computed between two programs based on comparing available metadata about these programs. Example metadata may include, listing of cast, crew, program runtime, categories, genre, closed captions or subtitles, synopses, ratings, etc. In some examples, the metadata can be obtained from web sources such as the Internet Movie Database (IMDb) or movie review web sites, Tribune Media Services (TMS), or other available sources.

The metadata may be available in various forms and may be organized into various fields. For example, metadata from particular sources about a movie may include fields such as program title, description, storyline, cast, crew, genre, etc. In another example, metadata can be obtained from a web source, including fields such as title, main content, cast, categories, trivia, internal links to and from other articles within the same web source, and external links to other web sources.

In one implementation, metadata about different programs can be obtained through internal links within the same web source, thereby providing a relatively uniform data source. In another implementation, external links may be included in the data association, though the data quality and format may be more heterogeneous, as the data are from a plurality of web sources/sites without a substantially uniform standard. In yet another implementation, data mining may be provided through a search engine and conducted throughout the world wide web (WWW).

Example Method

Figure 2:
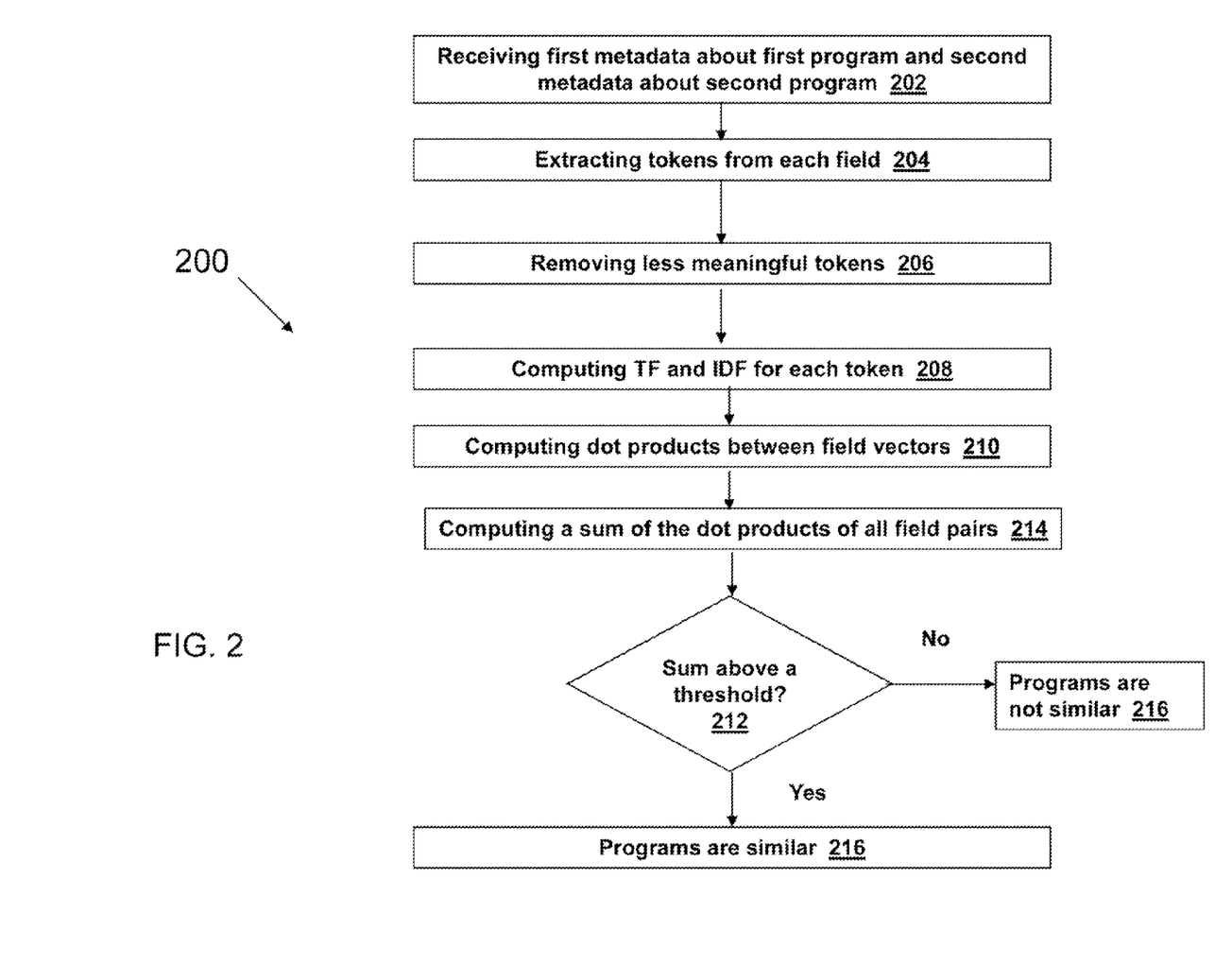
FIG. 2 is a flowchart illustrating an example of method of comparing similarities between media programs.

In one implementation, a method 200 of comparing two programs may be provided, as illustrated in the flowchart of FIG. 2. The method 200 may include the following operations.

In an operation 402, first metadata about a first media program and second metadata about a second media program may be received at a server for analysis using a processing circuit. In one example, the first and second programs may be two movies, the first and second metadata may be correspondingly two articles/reviews about these two movies. Each of the metadata are organized into a plurality of fields, such as main content or main description, cast, production, storyline, soundtrack description, distribution, reception, box office performance, awards, etc.

Next, in an operation 404, a plurality of tokens may be extracted from each field in the metadata of each program. A token may be the most frequently used terms. The text of each field may be recognized as single words, and/or phrases including two or more words. For example, two adjacent words "New" and "York" may be parsed as a phrase "New York," and recognized as a token.

In one example, in the field of "cast," each of the better known actors may be treated as a token. In one example, for a field including people's names, a first name and a last name may be combined into a single token. For descriptions, words may be combined into phrases if these words appear in the text together more than once, preferably more than a predetermined number of occasions.

In one implementation, to speed up the computation operations as described below, keywords can be globally converted into unique identifiers such as unique numbers, for a set of programs being analyzed.

For each field, an algorithm may be adopted to extract tokens from text. Different algorithms may be used for different fields, such as main content, title, cast, and trivia, for tokenization. A numerical relevance factor may be given for each token indicating its level of relevance in calculating the program similarities.

Main content of metadata sources (e.g., descriptions of movies, such as those obtained from TMS or other sources) often contain a large amount of textual data, and can be divided into sentences, sentence terminals, and/or clusters.

Terminals may be words occurring in the text, and/or words joined together if they form popular phrases. In one implementation, all terminals may be included as tokens. Their numerical relevance value may be given as 1, for example.

Clusters may be groups of words that are thematically connected to the text. For example, the content of a movie description may be determined using word clusters. In general, a word cluster may be a set of words that convey the same or similar ideas. A word cluster may be a set of synonyms, according to one implementation. Such a cluster may be used to identify movies devoted to the same topic, but use different terminology to do so. In some cases, a word cluster may include words that have related, but different meanings. In some implementations, a characteristic of a textual description may be a set of different word clusters. For each cluster, a numerical value describing its degree of connection to the media program may also be given. In one example, those clusters with a numerical value above a certain threshold may be included as tokens.

Program titles may not have sufficient text for grouping into sentences or phrases. Thus, the textual data from the titles can be divided (e.g., by whitespace) into individual words, and each word may be included as a token and given a relevance numerical value of 1, since titles are generally significant to the media programs.

In one implementation, every item on the cast list (such as that obtained from TMS cast data) can become a token. The cast list may be organized according to significance. Thus, in one example the leading actress' relevance score may be set to be 1. Other actors in the list can be given lower scores from the previous one, for example by a fixed factor.

The tokenization may be performed using one or more processing circuit portions automatically through mathematical models. The mathematical models may include probabilistic topic models based on word clusters.

In a first example, a probabilistic topic model may be applied to TMS "description" data or other movie descriptions form other sources. The probabilistic topic model can contain a large number (e.g., 12 million) of known terms and a large number (e.g., 1 million) of concepts, and probabilistic relations therebetween. The texts from the TMS "description" may be input to a generic topic model to be tokenized.

In one implementation, the following metadata fields of a program are tokenized: title, description, cast, genre, and director. Every token may be assigned a numerical weight factor, such as between 0 and 1, to indicate its relevance to the program. The numerical weight factors may be used in the calculations described below.

Another field in the metadata may be defined as a category provided by the source. In one implementation, each category is be passed through some predetermined rules for parsing. Some categories may be changed to broader categories and their weight factors may be adjusted. Some categories may be unmodified and given a weight factor of 1.

Every token may be assigned a weight within a field. The weight may depend on its relevance and the total number of programs in which the token occurs. In some cases a token may occur multiple times within one field. According to one implementation, its weight factors is aggregated according to a sub-linear function. For example, the aggregated weight factor can be much smaller than the sum of individual relevance scores. In one implementation, tokens are not aggregated across different fields.

In an operation 206, less meaningful tokens may be removed as outliers. These outliers may include those tokens that occur overly frequently in a field or globally in the metadata.

Despite the outliers, in general the number, or frequency, of occurrences of the tokens may indicate their contributions to relevance of the program. In one implementation, a modified TF-IDF (term frequency—inverse document frequency) method is adopted to compute the weight factors of the tokens, in an example operation 208. The TF may indicate a frequency of occurrences of a token within each field, and the IDF may indicate a frequency of occurrences of a token across different fields, such as in a whole document.

Specifically, for each token, a term frequency (TF) is computed. Different computing methods for different field types may be adopted. In one example, TF can be calculated as $TF=1+\log(x)$, where x is the number of the token's occurrences in a specific field of the metadata.

The IDF (Inverse Document Frequency) may also be computed across fields and/or documents. This frequency may be global for each field-token pair. In one implementation, the method of calculating the IDF is also set individually for each field type (e.g., title, cast, etc.) In one example, $IDE=1-\log(count)/\log(max\_count+1)$, where the count is the number of documents/fields in which the token occurs, and max_count is the maximum of these numbers.

In one implementation, a token's weight factor is based on the calculated TF and IDF, such as the multiplication of TF and IDF.

In one implementation, each field is considered as a vector, whose i-th component can be the weight of token i (in a global index). This vector may be normalized to have a length of 1. The similarity between two fields may be indicated by a correlation between the two vectors, such as the dot product (or scalar product, inner product) of the two normalized vectors.

It is noted that the vectors in the multi-dimension space and the dot products therebetween merely are one type of mathematical representation of relationships or correlations between fields of multiple components (tokens). Other mathematical tools and formulae can be used to calculate such relationships. In general, cross-correlations of the first and second tokens between the plurality of first fields and the plurality of second fields can be performed, and a similarity score between the first and second media programs can be based on the cross-correlations.

Figure 3:
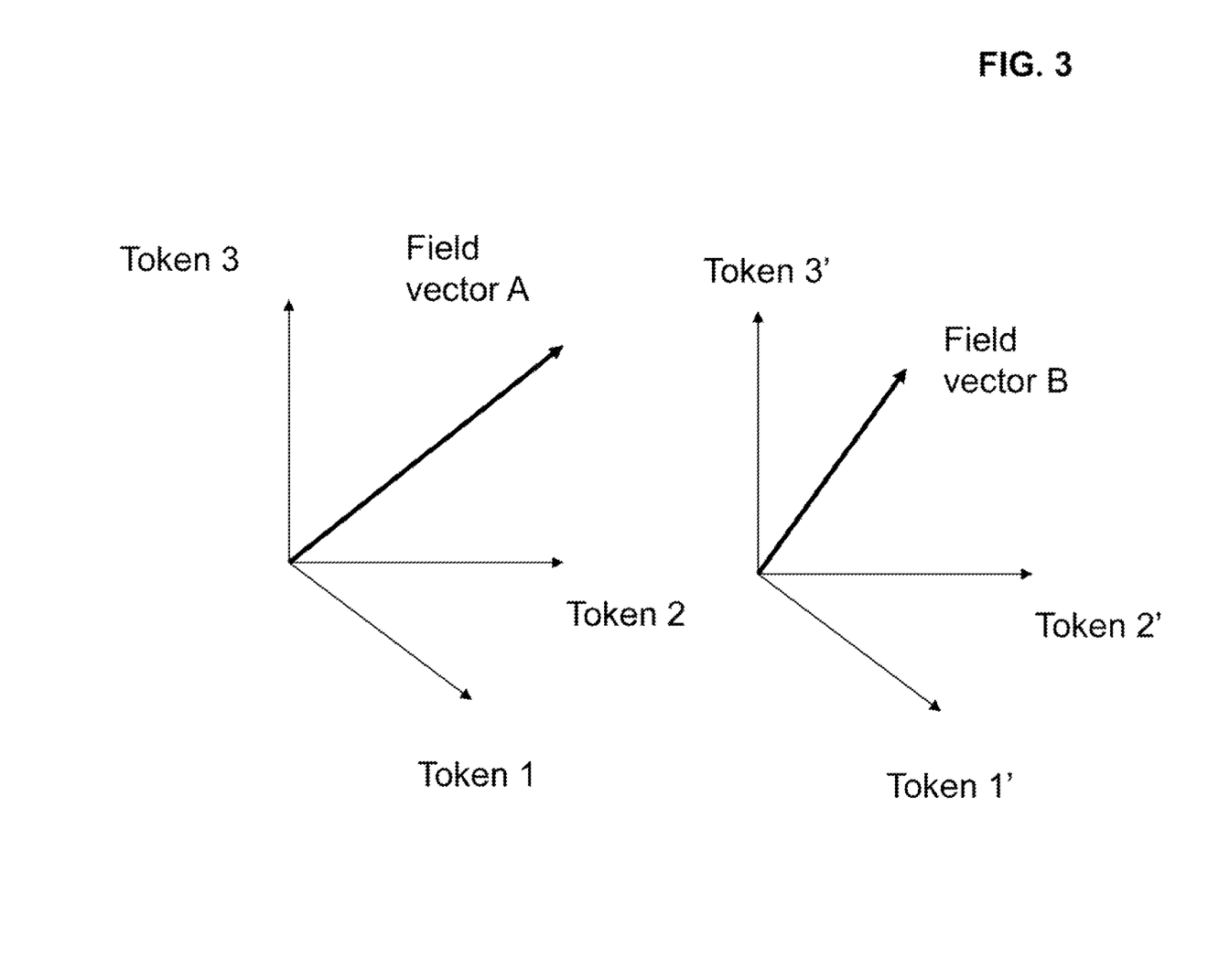
FIG. 3 is a diagram illustrating an example method of computing correlations between fields of different media programs using a vector presentation.
Figure 4:
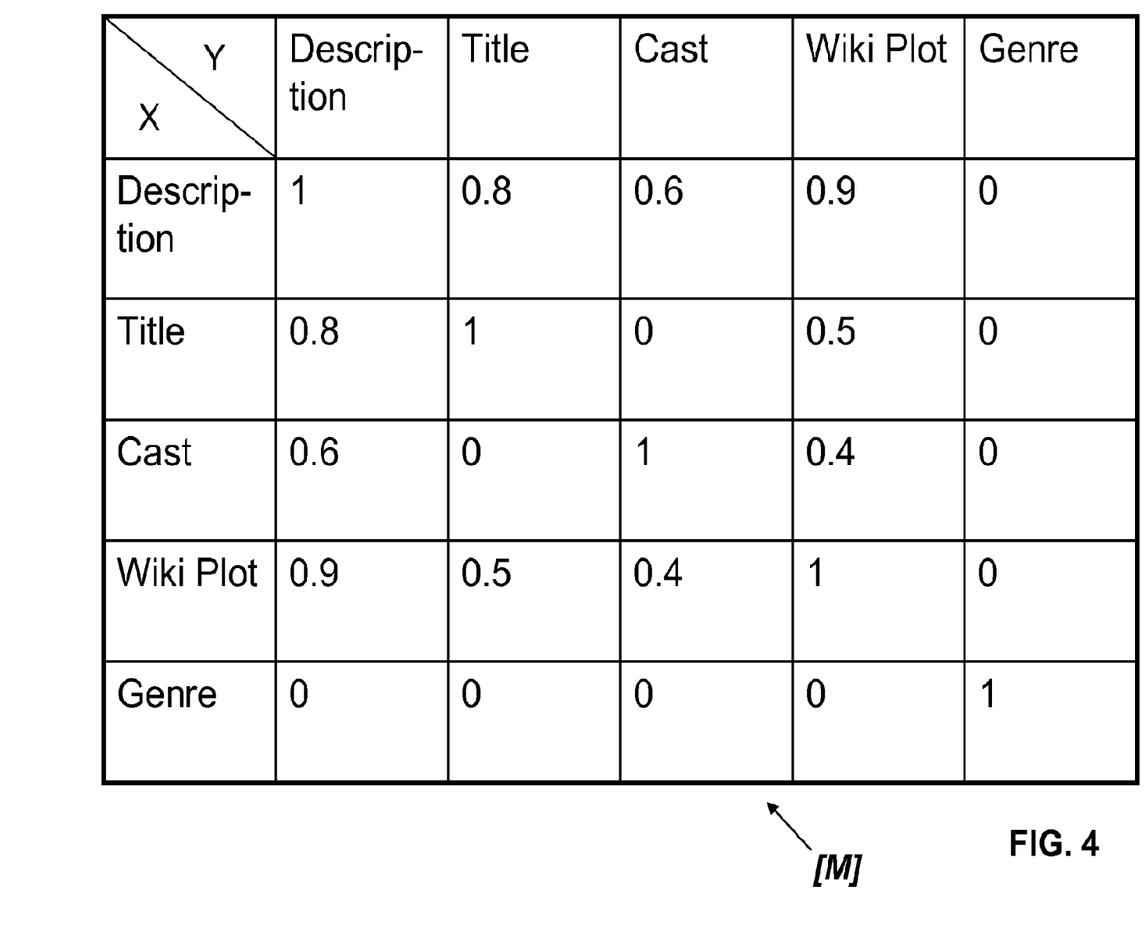
FIG. 4 is a diagram illustrating an example of a matrix of weight factors for cross-correlating different fields.

Specifically, after the tokenization process with each token's weight factor known, as illustrated in FIG. 3, a plurality of field vectors may be constructed for each program. Each field vector may represent a field and constructed based on the tokens extracted from the field and their weight factors.

For example, a field vector A may be constructed for the "cast" field for the first movie. In this example the cast vector A may have components on three token axes, such as Token 1 representing the name of a first actor, Token 2 representing the name of a second actor, and Token 3 representing a third actor. In some implementations a vector can have more or fewer components. A field vector B may be constructed for the "cast" field for the second movie, where Tokens 1', 2', and 3' represent three actors in the cast of the second movie.

The alignment of Token 1 and Token 1' indicates that the first actor is common in the two movies. Different actors are represented by orthogonal axes. Although the coordinate systems for field vectors A and B in the illustrative example in FIG. 3 are aligned, it is understandable to those of ordinary skill in the art that in many other cases the coordinate systems are completely orthogonal to each other in a multi-dimensional vector space, indicating that no common actors are in the two programs being compared.

The vectors may be normalized using normalization factors for the two token lists. In one implementation, each vector may be normalized on its lengths, such as by dividing the vector using the norm of the vector.

In some implementations, the normalization factor is modified by multiplying a power of one of more selected components to, for example, boost those vectors with more tokens, to promote shorter texts, and/or to promote certain tokens.

In general, the vectors may be normalized to a range of 0~1. In one example, a exponential power of 0~1 (such as ⅓) may be given to selected tokens, such as in the TF-IDF calculations. Those of ordinary skill in the art will recognize that other normalizations may be used in the process.

Next, in an operation 210, the dot-product of the two vectors A and B may be computed. The aligned axes for the field vectors A and B in FIG. 3 indicate that the dot-product will have a high value, indicating a high degree of similarities between the two movies (at least in terms of cast). In some other examples, there are no common actors in two movies, and all the components of the cast vectors are orthogonal, and the dot-product would be 0, indicating no similarities between the two movies (at least in terms of the cast).

Next, in an operation 214, the dot-products from all field pairs may be added to compute a similarity score.

In one implementation, a plurality of settings may be included in the computation. Such settings may include, for example, a matrix of weights (real numbers) representing how much comparison of tokens from various field types (including comparisons between same types) affect the final score, and proper TF and IDF functions to be used for each field type.

The similarity between two programs may be based on the similarities of individual pairs of fields. In one implementation, a matrix is provided that defines score multipliers for all pairs of fields (many of them may equal to 0). For example, the "description" field of program X may be directly compared to the "description" field of program Y, and the corresponding matrix component may have a value of 1. In addition, the "description" may be partially compared with other fields such as the "title," and the "storyline," etc, and the corresponding matrix components are non-zero. The non-zero across-fields matrix components indicates that some degrees of field mixing in calculating the similarity scores may be useful.

However, some field mixing is not useful for comparison calculations. The description generally cannot be compared with "genre," and thus the corresponding matrix components may be just 0.

An example matrix [M] is shown in FIG. 3, in which the numerical values of the matrix components is derived by testing various combinations to optimize the results in a statistical sampling process or given empirically. In the example shown, [M] may be a symmetric matrix.

Thus, in one implementation, the final similarity score between two media programs is calculated with a global sum using proper across-fields weights in a form of a matrix similar to that illustrated in FIG. 3. The tokens can be mixed according to such a pre-defined matrix of weights for each pair of field types. Similarities between different fields may thus be factored into the calculations. Mathematically the final similarity score may be expressed as $S=v_A[M] v_B$.

In some implementations, adjustment/normalizations are applied to computing TF and IDF. The TF-IDF methods may be applied to program-related metadata, adjusting token extraction and mixing results appropriately for different types of text (e.g. descriptions, cast, crew, storyline, etc) using the pre-defined matrix (such as [M]) of weights.

In one implementation, a bonus score is given for every pair of fields that have a positive similarity score, e.g., having at least one token in common.

Example Applications

The implementations disclosed herein may be used, for example, for determining related programs as part of a smart TV platform illustrated in FIG. 1.

Figure 5:
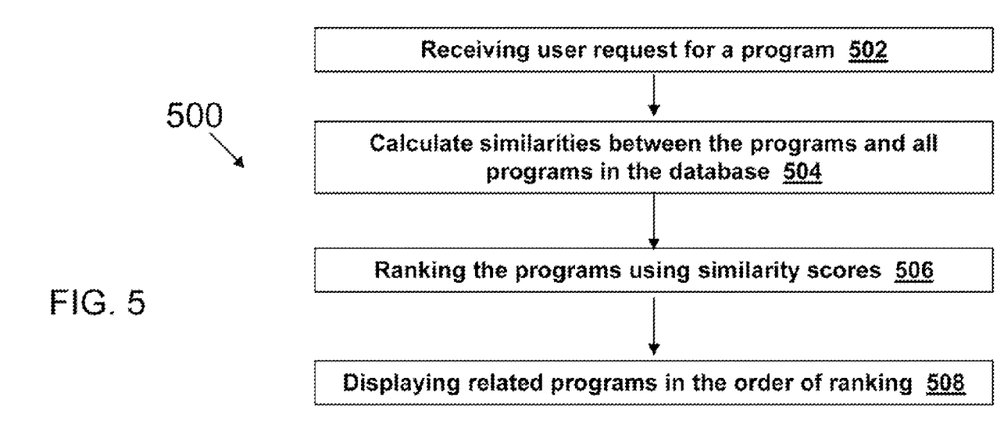
FIG. 5 is a flowchart illustrating an example method of recommending programs to a user.

FIG. 5 is a flowchart illustrating an example method 500 of recommending programs to a user. In an operation 502, when a user requests a media program or conducts a search of the media program on a smart TV platform, the server receives the request. Based on a plurality of fields of metadata of the program, such as casts and descriptions, similar programs can be found based on their respective metadata. In one implementation, all programs related to a program may be found by computing the program's similarity scores to all programs in the database in an operation 504. The programs with highest scores may be returned, and ranked according to the similarity scores in an operation 506. In an operation 508, the related programs may be displayed in an order according to their ranking along the requested program. For example, after a user first selects a movie on a smart TV module, more similar movie titles would appear based on their similarity scores. The movies recommended according to the implementations disclosed herein may be more accurately reflecting the user's interest as compared with, e.g., collaborative filtering techniques used by some vendors (e.g., Amazon, Netflix).

Figure 6:
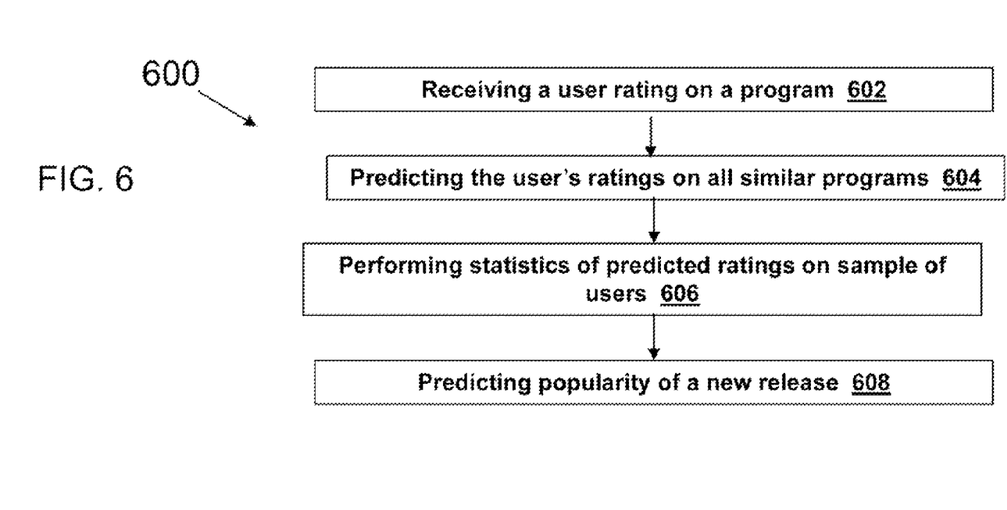
FIG. 6 is a flowchart illustrating an example method of predicting popularity of a program.

FIG. 6 is a flowchart illustrating an example method 600 of predicting popularity of a program. In an operation 602, the server may receive a star rating given by a user on a program (e.g., a number of stars or other ranking given by a user based on how much the user liked or disliked the program, such as one through five stars). The user may opt out of data collection, or may optionally provide additional data, such as demographic data that may be useful for recommending programs to the user. The user IDs associated with the rating or other user data are anonymized and not connected with user names. In an operation 604, the server can predict the user's ratings on all similar programs which the user has not seen, using the computation methods described above. In an operation 606, the statistics of the predicted ratings can be performed on a sample of users. In an operation 608, the system can also provide analysis to media program vendors regarding which programs, such as new releases, would likely become popular, based on popularity of similar movies.

For TV series, a coarse-grained model can be built, operating on a TV-series level, i.e., not on the seasons, or episodes level. The methods and systems can also apply to finer-grain models, such as comparing the similarity/difference between seasons, or episodes, of the same TV series.

Example System

Figure 7:
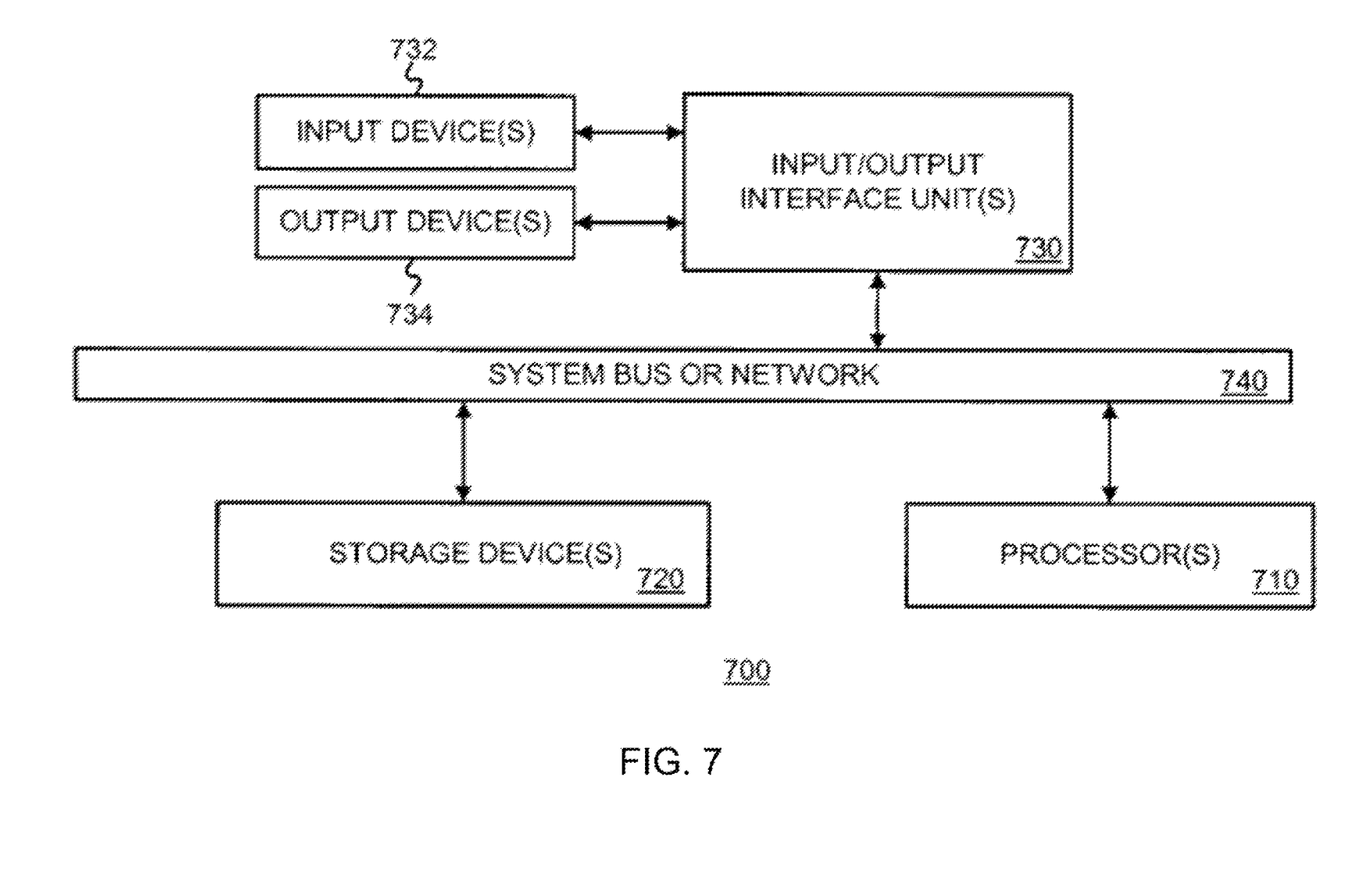
FIG. 7 is a block diagram illustrating a system that can be used to perform at least some of the various operations.

FIG. 7 is a block diagram illustrating a system that can be used to perform at least some of the various operations described above. The processor 710 may be a server processor, and may include one or more microprocessors or processing circuits. The bus 740 may include a system bus. The storage device 720 may include system memory, such a read only memory (ROM) and/or random access memory (RAM). The storage device 720 can include any suitable type of storage including, for example, a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or any other type of storage medium.

A user may enter commands and information into a user terminal such as a smart TV module, a personal computer, or a mobile device, through input device 732, such as a keyboard and pointing device (e.g., a mouse). Other input devices such as a microphone, a touch input interface, a joystick, a game pad, a satellite dish, a scanner, or the like, may also (or alternatively) be included. These and other input devices can be connected to the processor 710 through an appropriate interface 730 coupled to the network (e.g., the Internet) or a system bus 740.

The output device 734 may include a monitor or other types of display devices, which can be connected to the network 740 via an appropriate interface. In addition (or instead of) the monitor, the user terminal may include other (peripheral) output devices (not shown), such as speakers and printers for example. In some cases, output device 734 can include a component for providing one or more of a visual output, a haptic output, or an audio output.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A method for recommending media programs, the method comprising:
   determining, using a hardware processor, that a requested media program has been received on a media device;
   in response to determining that the requested media program has been received on the media device, obtaining metadata corresponding to the requested media program;
   obtaining metadata corresponding to a plurality of media programs, wherein the metadata corresponding to each media program and the metadata corresponding to the requested media program comprises a plurality of metadata fields corresponding to a plurality of field types, and wherein the plurality of metadata fields each comprise a plurality of terms;
   applying a probabilistic topic model to determine, for each of the plurality of metadata fields, at least one token by comparing the plurality of terms to a list of known terms and a probabilistic relationship between the known terms contained in the probabilistic topic model, wherein the at least one token comprises at least one of the plurality of terms;
   generating a first group of components based on a first metadata field for each of the plurality of media programs and a second group of components based on a second metadata field for the requested media program, wherein the components in the first group of components represent at least a portion of the tokens determined from the first metadata field for the media program and the components in the second group of components represent at least a portion of the tokens determined from the second metadata field, and wherein the first metadata field corresponds to a first field type from the plurality of field types and the second metadata field corresponds to a second field type from the plurality of field types;
   determining a plurality of weights that includes a weight for each field type from the plurality of field types in combination with another field type from the plurality of field types, including a weight for a combination of the first field type with the second field type;
   comparing the first group of components for each of the plurality of media programs to the second group of components for the requested media program to identify a subset of the plurality of media programs for which the first metadata field includes at least one common token with the first second metadata field of the requested media program;
   determining a similarity score between the requested media program and each of the identified subset of the plurality of media programs based at least in part on the comparison and the determined weight for the combination of the first field type and the second field type;
   selecting a portion of the plurality of media programs based on the similarity score; and
   responsive to the request for the media program, causing a recommendation interface to be presented on the media device that recommends one or more of the selected portion of the plurality of media programs for consumption.

2. The method of claim 1, wherein the first group of components is an ordered group of components, where each position in the ordered group corresponds to one or more tokens.

3. The method of claim 2, wherein the first group of components is a vector.

4. The method of claim 1, wherein a first token of the at least one token comprises text in the first metadata field.

5. The method of claim 4, wherein the first token of the at least one token comprises a combination of text keywords included in the first metadata field.

6. The method of claim 1, further comprising calculating a term frequency for the at least one token equal to the sum of the logarithm of the number of the token's occurrences in the first metadata fields corresponding to the plurality of programs and 1.

7. The method of claim 1, wherein the first field type is a description field type and the second field type is a title field type.

8. The method of claim 1, further comprising:
   identifying a token having a frequency of occurrence in the first metadata fields corresponding to the plurality of programs exceeding a predetermined threshold; and
   inhibiting the identified token from being used to generate the first group of components.

9. The method of claim 1, further comprising:
   calculating, for each component in the first group of components corresponding to each of the plurality of media programs, a weight factor based on the number of occurrences of the token corresponding to a particular component of the group of components in the first metadata field corresponding to a particular media program of the plurality of media programs and the number of first metadata fields corresponding to the plurality of programs in which the token corresponding to the particular component occurs; and
   weighting each component in the first group of components corresponding to each of the plurality of media programs based on the calculated weight factors.

10. A system for recommending media programs, the system comprising:
    a memory; and
    a hardware processor that, when executing computer executable instructions stored in the memory, is programmed to:
    determine that a requested media program has been received on a media device;

in response to determining that the requested media program has been received on the media device, obtain metadata corresponding to the requested media program;

obtain metadata corresponding to a plurality of media programs, wherein the metadata corresponding to each media program and the metadata corresponding to the requested media program comprises a plurality of metadata fields corresponding to a plurality of field types, and wherein the plurality of metadata fields each comprise a plurality of terms;

apply a probabilistic topic model to determine, for each of the plurality of metadata fields, at least one token by comparing the plurality of terms to a list of known terms and a probabilistic relationship between the known terms contained in the probabilistic topic model, wherein the at least one token comprises at least one of the plurality of terms;

generate a first group of components based on a first metadata field for each of the plurality of media programs and a second group of components based on a second metadata field for the requested media program, wherein the components in the first group of components represent at least a portion of the tokens determined from the first metadata field and the components in the second group of components represent at least a portion of the tokens determined from the second metadata field, and wherein the first metadata field corresponds to a first field type from the plurality of field types and the second metadata field corresponds to a second field type from the plurality of field types;

determine a plurality of weights that includes a weight for each field type from the plurality of field types in combination with another field type from the plurality of field types, including a weight for a combination of the first field type with the second field type;

compare the first group of components for each of the plurality of media programs to the second group of components for the requested media program to identify a subset of the plurality of media programs for which the first metadata field includes at least one common token with the second metadata field of the requested media program;

determine a similarity score between the requested media program and each of the identified subset of the plurality of media programs based at least in part on the comparison and the determined weight for the combination of the first field type and the second field type;

select a portion of the plurality of media programs based on the similarity score; and responsive to the request for the media program, cause a recommendation interface to be presented on the media device that recommends one or more of the selected portion of the plurality of media programs for consumption.

11. The system of claim 10, wherein the first group of components is an ordered group of components, where each position in the ordered group corresponds to one or more tokens.

12. The system of claim 11, wherein the first group of components is a vector.

13. The system of claim 10, wherein a first token of the at least one token comprises text in the first metadata field.

14. The system of claim 13, wherein the first token of the at least one token comprises a combination of text keywords included in the first metadata field.

15. The system of claim 10, wherein the hardware processor is further programmed to calculate a term frequency for the at least one token equal to the sum of the logarithm of the number of the token's occurrences in the first metadata fields corresponding to the plurality of programs and 1.

16. The system of claim 10, wherein the first field type is a description field type and the second field type is a title field type.

17. The system of claim 10, wherein the hardware processor is further programmed to:
identify a token having a frequency of occurrence in the first metadata fields corresponding to the plurality of programs exceeding a predetermined threshold; and
inhibit the identified token from being used to generate the first group of components.

18. The system of claim 10, wherein the hardware processor is further programmed to:
calculate, for each component in the first group of components corresponding to each of the plurality of media programs, a weight factor based on the number of occurrences of the token corresponding to a particular component of the group of components in the first metadata field corresponding to a particular media program of the plurality of media programs and the number of first metadata fields corresponding to the plurality of programs in which the token corresponding to the particular component occurs; and
weight each component in the first group of components corresponding to each of the plurality of media programs based on the calculated weight factors.

19. A non-transitory computer-readable medium containing computer executable instructions that, when executed by a processor, cause the processor to perform a method of recommending media programs, the method comprising:
determining that a requested media program has been received on a media device;
in response to determining that the requested media program has been received on the media device, obtaining metadata corresponding to the requested media program;
obtaining metadata corresponding to a plurality of media programs, wherein the metadata corresponding to each media program and the metadata corresponding to the requested media program comprises a plurality of metadata fields corresponding to a plurality of field types, and wherein the plurality of metadata fields each comprise a plurality of terms;
applying a probabilistic topic model to determine, for each of the plurality of metadata fields, at least one token by comparing the plurality of terms to a list of known terms and a probabilistic relationship between the known terms contained in the probabilistic topic model, wherein the at least one token comprises at least one of the plurality of terms;
generating a first group of components based on a first metadata field for each of the plurality of media programs and a second group of components based on a second metadata field for the requested media program, wherein the components in the first group of components represent at least a portion of the tokens determined from the first metadata field and the components in the second group of components represent at least a portion of the tokens determined from the second metadata field, and wherein the first metadata field corresponds to a first field type from the plurality of field types and the second metadata field corresponds to a second field type from the plurality of field types;

determining a plurality of weights that includes a weight for each field type from the plurality of field types in combination with another field type from the plurality of field types, including a weight for a combination of the first field type with the second field type;

comparing the first group of components for each of the plurality of media programs to the second group of components for the requested media program to identify a subset of the plurality of media programs for which the first metadata field includes at least one common token with the second metadata field of the requested media program;

determining a similarity score between the requested media program and each of the identified subset of the plurality of media programs based at least in part on the comparison and the determined weight for the combination of the first field type and the second field type;

selecting a portion of the plurality of media programs based on the similarity score; and responsive to the request for the media program, causing a recommendation interface to be presented on the media device that recommends one or more of the selected portion of the plurality of media programs for consumption.

20. The non-transitory computer-readable medium of claim 19, wherein the first field type is a description field type and the second field type is a title field type.

* * * * *